Figure 1:
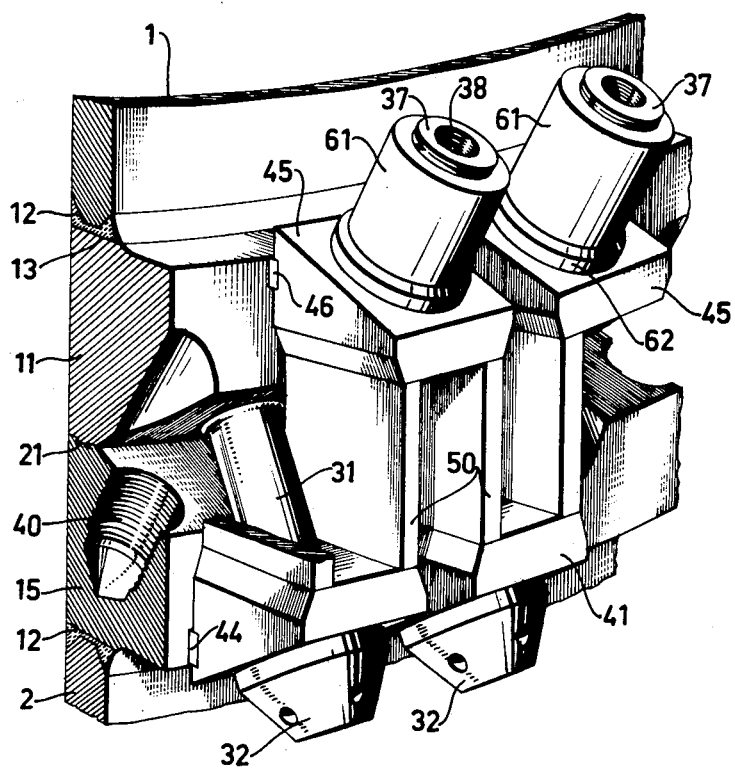

Nov. 23, 1965   CARL ÅKE MOBERG   3,219,370
FLANGED JOINT

Filed Jan. 28, 1963   4 Sheets-Sheet 4

# United States Patent Office 3,219,370
Patented Nov. 23, 1965

3,219,370
FLANGED JOINT
Carl Åke Moberg, Bromma, Sweden, assignor to Aktiebolaget Atomenergi, Stockholm, Sweden, a company of Sweden
Filed Jan. 28, 1963, Ser. No. 254,276
Claims priority, application Sweden Feb. 1, 1962
10 Claims. (Cl. 285—368)

The invention is concerned with flanged joints intended to connect bodies, and concerns particularly flanged joints joining different parts of containers, receivers or pipes, and is particularly advantageous in the case of apparatuses where the joint is being subjected to high stressing, as for instance in the case of pressure-vessels used in atomic reactors, which are subjected to high internal working pressures, of the order of 50 atm., and also to considerable temperature differences between the different parts of the flanged joint during periods of start-up and close-down.

The purpose of the invention is therefore to achieve a type of flanged joint which is substantially free from stressing caused either by the forces keeping the parts together or by the large internal pressure or temperature differences that may occur between the different parts of the joint and the pressure vessel. In particular a design is wanted which, at the point of attachment to the main body, is substantially free from bending and/or twisting moments caused by the tightening-up of the joint or by the pressure and temperature differences or such variations in the joint. Also, the purpose of the invention is to design a type of flange with considerably smaller dimensions and consequently less material consuming than hitherto known designs for very high pressure and temperature loads. In this way the joint may be produced cheaper and also the manufacture of the apparatus including the joint will be considerably simplified.

In general, the design consists of two flanges fixed usually by way of welding, to the parts that are to be connected by a limited attachment area, in practice equal to the cross-sectional area of the tank wall or the equivalent part of some other type of body.

At least some part of the common face of the two flanges is designed to act as a packing area, this space is usually taken up by a seal.

This packing area should preferably be in line with the two attachment areas, and as the flanged joint is normally applied to the parts of some kind of container or pressure vessel, i.e. the wall sections or the top of a reactor pressure-vessel, the tightening pressure in the flanged joint will be applied in an axial direction. The axial direction, therefore, here signifies the direction in which the parts are kept together and the tightening pressure acts, even if this direction is not truly axial.

As the most vulnerable parts of a flanged joint are the points of attachment to the bodies that are to be joined, it is desirable that the loading at these points (the points of attachment) is directed axially and that no bending or twisting moments arise.

In order to achieve the purpose of the invention and also to obtain some other advantages as will be shown in the following description, the flanged joint comprises several tension members (e.g., bolts) obliquely extending from each flange and outside the adjacent one, each tension member being connected with a thrust element resting against the adjacent flange and also connected with two adjacent identical thrust elements associated with two adjacent tension members from the other flange, preferably through special spacing members.

To make the invention and in particular some embodiments of it more easily understood, a type of design not limiting the scope of the invention will now be described with reference to the arrangement indicated on the drawing enclosed.

Figure 2:
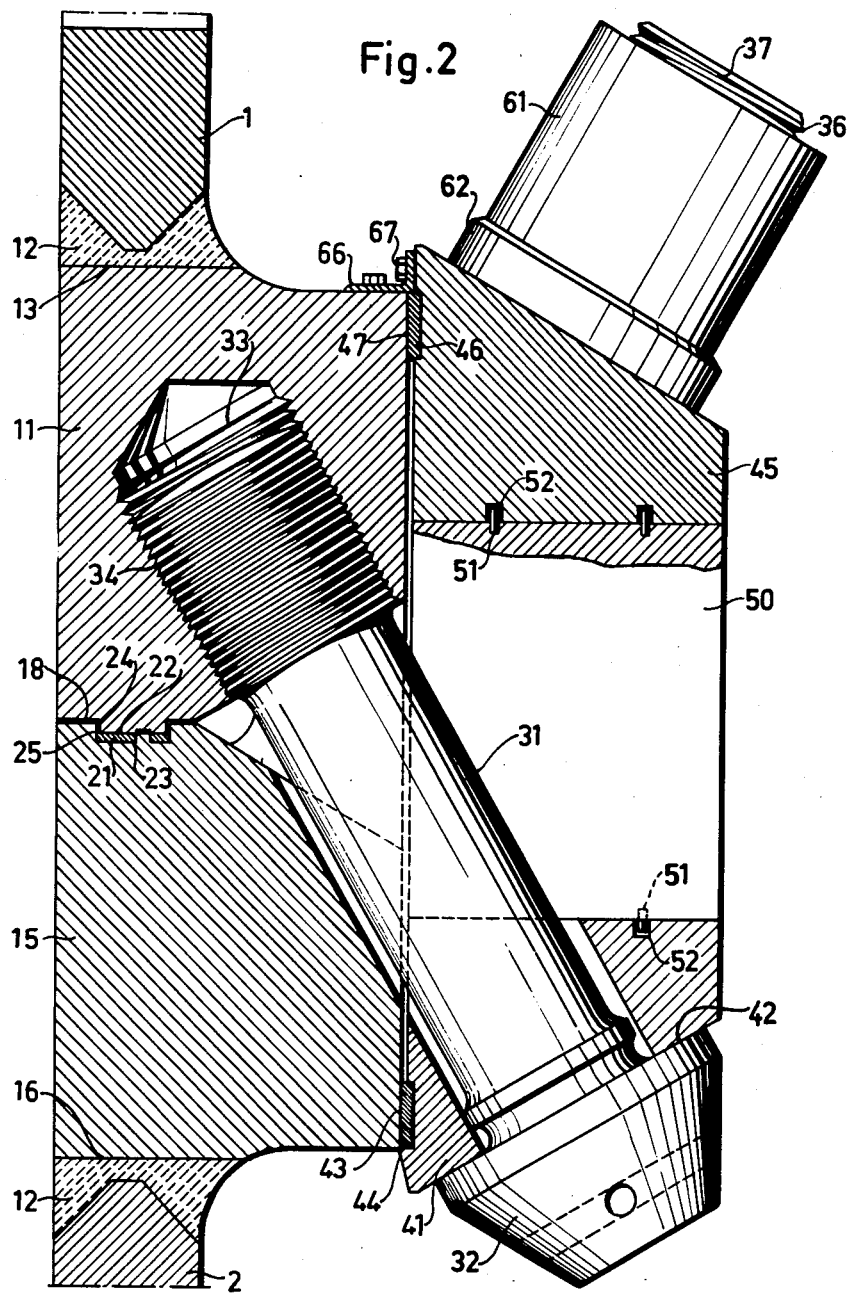
Figure 3:
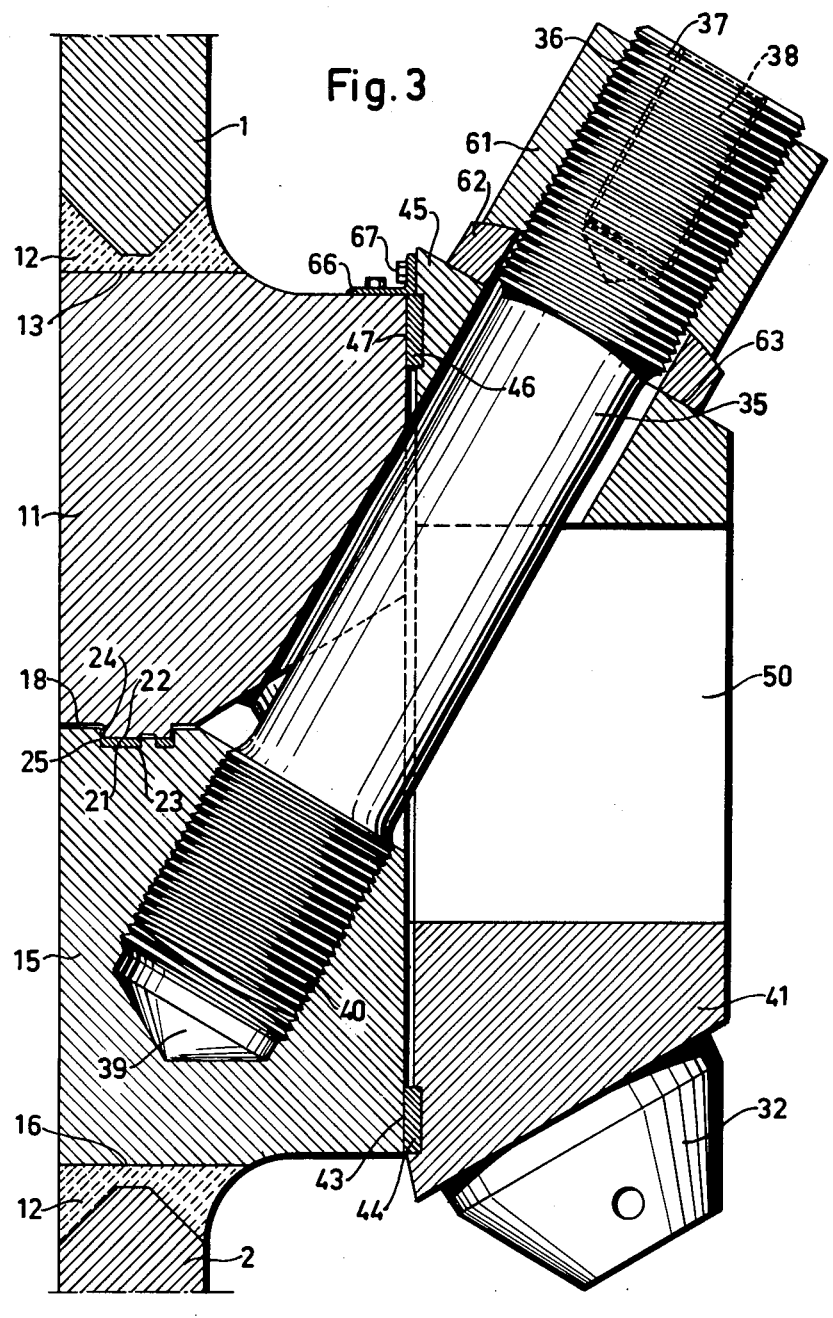

On the drawing is shown:
FIG. 1, part of a flanged joint of the type invented shown in perspective,
FIGS. 2 and 3, axial view of the flanged joint through the lower and upper tension member respectively, and
FIGS. 4 and 5, alternative forms of spacing members.

The flanged joint is to join body 1, which may be taken to be the cylindrical part of a reactor top, to body 2, this being the upper part of the wall of such a reactor.

The flange 11 is secured to the top body 1 by means of a weld 12, thereby connecting these bodies along the common area 13.

In the same way the flange ring 15 is secured to the wall 2 by means of a similar weld 12 along the surface 16. The two flanges face each other along the area 18 and tighten against each other through a seal 21 situated between the sealing surfaces 22 and 23 on the flanges 11 and 15 respectively, in this case arranged on a protruding portion 24 or a groove 25.

The seal ought to lie in line between the faces 13 and 16 because, as will be shown presently, the tightening pressure should be produced by forces aligning the cylindrical parts 1 and 2 of the container and therefore being axial. The tension members of the joint consist of powerful screws, for flange 11 the screw 31 with head 32 screwed into the hole 33 with threads 34, and for flange 15 the screw 35 which is secured to its flange in a similar way and instead of head has an end portion 37 provided with threads 36, that has a tapped axial hole 38, where a special pulling member may be inserted to accomplish the tightening up of the flanged joint. Every second screw belongs to flange 11 or 15 respectively. As a support for the screw 31 a thrust segment 41 is provided. This offers a pressure-surface 42 to the head 32 at right angles to the direction in which the screw 31 is screwed into the flange 11, in this case about 30° to the axial direction. The thrust segment 41 is situated so as to rest against the other flange 15 in an, in axial direction fairly limited contact area 43, where a sliding-plate 44 is inserted in a groove in the thrust segment to transmit the thrust.

In a similar fashion the screw 35 is intended for joint action with the thrust segment 45 which through a sliding plate 46 is in contact with a thrust area 47 on the flange 11. The thrust segments 41 and 45, which might have been designed so as to axially touch each other directly, have in the configuration shown spacing members between each other in the form of radially positioned plates 50 secured to the thrust segments by means of location pins 51 fitting into holes 52 in the thrust segments.

Figure 4:
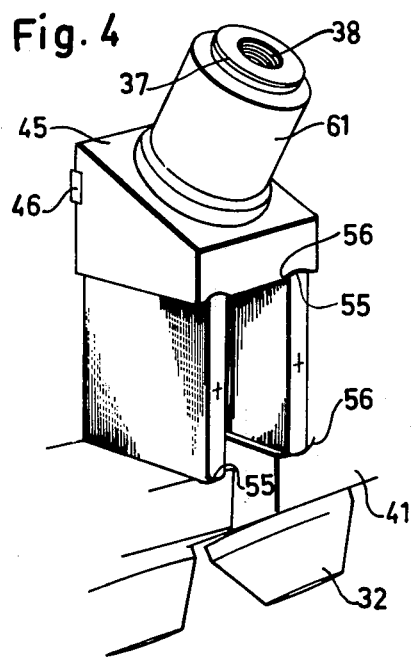
Figure 5:
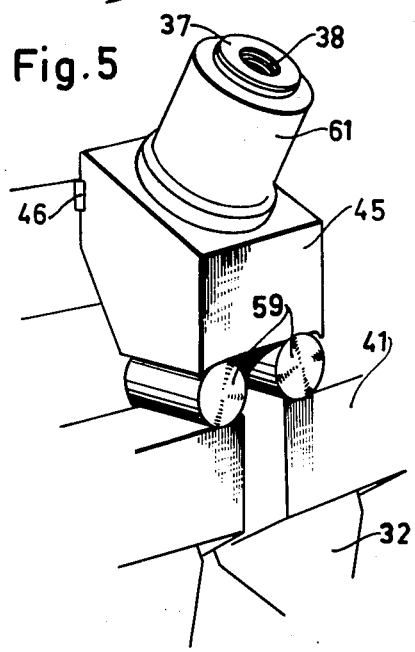

As is best seen from FIG. 1, each upper thrust segment 45 is arranged so as to rest against two adjacent lower thrust segments 41. The spacing members may, as indicated in FIG. 4, be equipped with cylindrical contact surfaces 55, preferably with the centre in the middle of the two, supported by the thrust segments, suitably in the grooves 56 which may have a cylindrical contact surface with a larger radius of curvature than surfaces 55. It is also possible, as shown in FIG. 5, to arrange rollers 59 between the thrust segments. Due to the fact that the spacing members separating the thrust segments 50 are comparatively high and narrow as well as positioned radially, they are able to neutralize the peripheral displacements between adjacent thrust segments that may arise due to temperature variations in the container or the flanged joint.

The arrangement of thrust segments and spacing members are then able to move like a concertina. Such displacements are facilitated by the cylindrical form of the contact surfaces, or by the rollers.

The upper screw 35 as shown in the drawing is supported by the thrust segment 45 through a nut 61 threaded onto 36, which through a ball washer is in contact with a surface 63 on the thrust segment 45, equivalent to surface 42 on body 41.

In order to ease the fitting, the thrust segment 45 is temporarily attached to the flange 11 by means of the angle iron 66 and screws 67.

In assembling the flanged joint the starting member is the top 1 with its attached flange 11 suspended from a traversing crane or otherwise supported. The upper thrust segment 45 with the sliding plate 46 is mounted on the flange 11 by means of the angle irons 66, thereafter the screws 31 with fitted thrust segment 41 are screwed into the flange 11, at this point the sliding plates 44 might have been inserted. The thrust segment spacing members 50 are placed between the thrust segments 41 and 45, and the screws 31 are tightened up sufficiently to keep the parts so fitted in position.

The assembly is then mounted on the container with the flange 15, whereby the seal 21, and if this has not already been done the slide plates 44, is brought into their place. When the flange 11 has been positioned correctly on the flange 15, it is convenient to tighten up the screw 31 to the predetermined position, usually up to the point where the spacing members 50 become firmly fixed. Thereafter the whole flanged joint is tightened up by means of a pulling tool screwed into a hole 38 in screw 35. The angle iron is of course taken away.

The mounting procedure may of course be carried out differently, for instance so that the screw 31 is first screwed into the flange 11 with the thrust segment 41 fitted, whereafter the spacing members are brought into position and the thrust segment is mounted upon these. The screw 31 is then screwed in until it comes into the correct position, whereby the angle iron 66 may be screwed on, if so desired. The screw 35 is fitted and the tightening-up process carried out as described above.

Due to the tightening of the flanged joint each flange of the type just described will be subjected to a tensile force in the direction of the tension members 31, 35 and a normal force exerted by the thrust segments 45, 41 against the surfaces 47, 43 on the outside of the flange.

The tension members in the two flanges should preferably have mainly the same angular direction with respect to the axial direction. If the thrust segment is in contact with the flange along an in axial direction limited area 47, 43, then the normal force will be transmitted within this limited area at right angles to the axial direction of the flanged joint. At the packing area 22, 23, between the two flanges, a sealing pressure will arise caused by the contracting action of the two tension members 31, 35 on the two flanges. This sealing pressure is made up of the axial component of the tensile forces in the tension members and if the packing area between the flanges is situated in line with the points of attachment of the flanges to the vessel wall, then the axial component of the tensile forces will, to prevent detrimental bending moments arising, lie along the same line. The component at right angles, however, the radial component, exercises a twisting moment at the attachment area 13, 16 which is at least partly counteracted by the moment caused by the normal pressure exerted by the thrust segment on the thrust face 47, 43.

If now this thrust face is positioned in such a way in axial direction, that the normal force, which acts radially, intersects the axial line joining the centres of the two attachment areas in the same point as the tensile force from the tension member intersects this line, then the pressure acting normally will counteract the radial component of the tensile force, and the attachment areas will be completely free from moment action. In such an ideal case, as just described, the flanged joint will behave practically quite neutral and stand up to all pressures which the pressure vessel is itself able to sustain.

To eliminate stressing due to temperature differences the projected intersection point between the center lines (or, corresponding tensile forces) of two adjacent tension members 31, 35, pointing toward each other in a radial axial plan, should lie in—or, near to—the tangential axial plan, in which the adjacent thrust segments 47, 43 are positioned against the flanges. The above mentioned plan may be said to constitute the dividing line between two temperature regions, in so much as the flanges in themselves and also the neighbouring parts of the tension members have mainly the same temperature, while the parts lying on the outside of this plan, viz. the outer parts of the tension members, thrust segments and spacing members have mainly the same temperature, different from that of the flanges.

Therefore, when the flanged joint increases in temperature and the joint expands axially, while the temperature of the said outer parts is mainly constant, an axial displacement will occur between them, this relative motion taking place against the frictional forces along said thrust faces. The outer parts may thereby be considered to act as a rigid body, which in principle is joined to the flanges in the said cross-over point only. If one chooses a material with a low coefficient of friction for the slide plates 44 and 46, for instance aluminum bronze, suitably lubricated by graphite, the frictional force may be reduced to a value of .2 or less, insignificant as far as the creation of an unwanted moment is concerned. Rollers may be used instead of sliding plates.

The ability of the flanged joint to stand up to thermal expansion in a radial direction is, as mentioned previously, due to the "concertina action" of the thrust segment system.

In the embodiment illustrated in the drawings the contact areas between the two flanges comprise a seal ring 21. However, it is within the scope of the invention to provide the sealing means in some other way known in the art e.g. by a toroid connecting the two flanges. In this case the contact areas have no sealing purpose, but serve merely to support the two flanges on each other.

What is claimed is:

1. A flanged joint, comprising a first flange, a second flange, contact areas between said two flanges, a first set of thrust members abutting on the periphery of the first flange, a second set of thrust members abutting on the periphery of the second flange, a first set of tension members extending obliquely from the first flange to the second set of thrust members, a second set of tension members extending obliquely from the second flange to the first set of thrust members, the tension members of said second set alternating with the tension members of said first set, each tension member extending from one flange to the thrust member which abuts on the periphery of the other flange, and spacing members between the thrust members of the first set and those of the second set.

2. A flanged joint as claimed in claim 1, comprising wall members secured to said first and second flanges, said contact areas being arranged substantially in alignment with the axes of said wall members.

3. A flanged joint as claim in claim 1, in which the spacing members are flat, rectangular plates supporting with one edge on a thrust member of the first set and with the opposed edge on a thrust member of the second set.

4. A flanged joint, comprising a first flange, a second flange, contact areas between said two flanges, a first set of thrust members abutting on the periphery of the first flange, a second set of thrust members abutting on the periphery of the second flange, a first set of tension members extending obliquely from the first flange to the second set of thrust members, a second set of tension members extending obliquely from the second flange to the first set of thrust members, the tension members of said second set alternating with the tension members of said first set, each tension member extending from one flange to the thrust member which abuts on the periphery of the other flange, and spacing members between the thrust members of the first set and those of the second set, said flanged joint being further characterized in that there is one particular thrust member for each particular tension member, each thrust member of one set being kept apart from two adjacent thrust members of the other set by means of two spacing members.

5. A flanged joint, comprising a first flange, a second flange, contact areas between said two flanges, a first set of thrust members abutting on the periphery of the first flange, a second set of thrust members abutting on the periphery of the second flange, a first set of tension members extending obliquely from the first flange to the second set of thrust members, a second set of tension members extending obliquely from the second flange to the first set of thrust members, the tension members of said second set alternating with the tension members of said first set, each tension member extending from one flange to the thrust member which abuts on the periphery of the other flanges, and spacing members between the thrust members of the first set and those of the second set, said flanged joint being further characterized in that the spacing members are flat, rectangular plates supporting with one edge on a thrust member of the first set and with the opposed edge on a thrust member of the second set, and in that said two opposed edges of the rectangular spacing members are shaped with cylindrical surfaces.

6. A flanged joint, comprising a first flange, a second flange, contact areas between said two flanges, a first set of thrust members abutting on the periphery of the first flange, a second set of thrust members abutting on the periphery of the second flange, a first set of tension members extending obliquely from the first flange to the second set of thrust members, a second set of tension members extending obliquely from the second flange to the first set of thrust members, the tension members of said second set alternating with the tension members of said first set, each tension member extending from one flange to the thrust member which abuts on the periphery of the other flange, and spacing members between the thrust members of the first set and those of the second set, said flanged joint being further characterized in that said spacing members are rollers.

7. A flanged joint as claimed in claim 1, in which the contact surface between a thrust member and the periphery of the flange does not amount to more than one fourth of the thickness of the flange.

8. A flanged joint as claimed in claim 2, in which (1) the surface defined as the middle surface of the wall members, and (2) the conical surface defined by the lines representing the tensile forces of one set of tension members, and (3) the plane defined by the lines representing the resulting pressure forces exerted by the same set of thrust members on the corresponding flange intersect each other substantially along one line.

9. A flanged joint as claimed in claim 1, in which the tension members of the first set and the tension members of the second set cross each other in the cylindrical surface defined by the contact surfaces between the thrust members and the flanges.

10. A flanged joint as claimed in claim 9, in which the angle of the first set of tension members relative to said cylindrical surface is substantially equal to the angle of the second set of tension members relative to said cylindrical surface.

References Cited by the Examiner

UNITED STATES PATENTS

| | | | |
|---|---|---|---|
| 570,975 | 11/1896 | Anderson | 285—412 |
| 2,457,073 | 12/1948 | Stearns | 285—187 X |

FOREIGN PATENTS 800,516  11/1950  Germany.

CARL W. TOMLIN, *Primary Examiner.*

RAYMOND E. SCOTT, *Assistant Examiner.*